(12) United States Patent
Croll et al.

(10) Patent No.: US 12,688,530 B1
(45) Date of Patent: Jul. 21, 2026

(54) PERSONALIZED RECOMMENDATIONS

(71) Applicant: Wells Fargo Bank, N.A., San Francisco, CA (US)

(72) Inventors: Erin Aine Croll, Des Moines, IA (US); Aaron Friedel, Urbandale, IA (US); Danny Ray Grizzle, Clive, IA (US); Dale Steven Howard, Clive, IA (US); Narendra Nath, Hillsborough, CA (US); Lacey Ann Schiesl, Johnston, IA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 197 days.

(21) Appl. No.: 18/174,054

(22) Filed: Feb. 24, 2023

Related U.S. Application Data

(60) Provisional application No. 63/268,935, filed on Mar. 7, 2022.

(51) Int. Cl.
*G06Q 50/16* (2024.01)
*G06Q 40/02* (2023.01)

(52) U.S. Cl.
CPC ............. *G06Q 40/02* (2013.01); *G06Q 50/16* (2013.01)

(58) Field of Classification Search
CPC ............................... G06Q 40/02; G06Q 50/16
See application file for complete search history.

(56) References Cited

U.S. PATENT DOCUMENTS

| | | | |
|---|---|---|---|
| 6,349,290 | B1 | 2/2002 | Horowitz et al. |
| 8,458,205 | B2 | 6/2013 | Huang et al. |

| | | | | |
|---|---|---|---|---|
| RE45,959 | E | 3/2016 | McCord et al. | |
| 9,978,089 | B2 | 5/2018 | Patel et al. | |
| 11,038,974 | B1 * | 6/2021 | Koukoumidis | ........ G06Q 10/00 |
| 11,900,451 | B1 * | 2/2024 | King | ................... G06Q 40/0631 |
| 2004/0083164 | A1 | 4/2004 | Schwartz et al. | |
| 2006/0253474 | A1 | 11/2006 | Hotchkiss et al. | |
| 2015/0134511 | A1 | 5/2015 | Ghosh et al. | |
| 2017/0161855 | A1 | 6/2017 | Schreyer | |
| 2019/0065993 | A1 * | 2/2019 | Srinivasan | ............. G06N 20/00 |
| 2019/0080425 | A1 * | 3/2019 | Bui | .................... G06Q 10/0631 |
| 2020/0126370 | A1 * | 4/2020 | Zalewski | ................ H04W 4/80 |

(Continued)

FOREIGN PATENT DOCUMENTS

| | | | | | |
|---|---|---|---|---|---|
| KR | 20210102032 | A | * | 8/2021 | ............. G10L 15/26 |
| WO | WO-2014201042 | A1 | * | 12/2014 | ......... G06Q 30/0269 |

OTHER PUBLICATIONS

Thompson, "A Personalized system for conversational recommendations" (Year: 2003).*

(Continued)

*Primary Examiner* — Sangeeta Bahl

(74) *Attorney, Agent, or Firm* — Merchant & Gould P.C.

(57) ABSTRACT

An example computer system for determining a recommendation can include: one or more processors; and non-transitory computer-readable storage media encoding instructions which, when executed by the one or more processors, causes the computer system to: receive a signal associated with an action or an inaction by a user; generate a machine learning model using the signal; process the machine learning model through a rules engine to generate the recommendation; and present the recommendation to the user through a non-traditional communication channel.

20 Claims, 9 Drawing Sheets

(56)                    References Cited

U.S. PATENT DOCUMENTS

| | | |
|---|---|---|
| 2020/0320607 A1 | 10/2020 | Beauchamp |
| 2021/0142217 A1* | 5/2021 | Valline ................. G06F 16/245 |
| 2021/0314523 A1* | 10/2021 | Kamisetty ........... H04L 65/1069 |
| 2021/0374671 A1* | 12/2021 | Li .......................... G06N 3/044 |
| 2022/0036251 A1* | 2/2022 | Zweig ................ G10L 15/1815 |
| 2022/0036450 A1* | 2/2022 | Sanghvi ................ G06N 5/043 |
| 2022/0076669 A1* | 3/2022 | Hatambeiki ..... H04N 21/42203 |

OTHER PUBLICATIONS

Torrens, "A banking platform to leverage data driven marketing with ML" (Year: 2022).*

Rafailidis, "The technology gap between virtual assistants and recommendation Systems" (Year: 2018).*

Dadios, Elmer P. et al., "Fuzzy-Neuro Model for Intelligent Credit Risk Management," Intelligent Information Management, vol. 4, No. 5A, Oct. 2012, pp. 251-260.

Moradi, Somayeh et al., "A dynamic credit risk assessment model with data mining techniques: evidence from ranian banks," https://jfin-swufe.springeropen.com/articles/10.1186/s40854-019-0121-9, 27 pages.

* cited by examiner

112

600

602

Receive user data

604

Generate user model

606

Process user model through rules engine

608

Present rules engine result on a user interface

800

802 — Receive data from user

804 — Manipulate data

806 — Push data to content delivery system

808 — Content delivery system communicates with user

810 — Receive response from user

812 — Content delivery system responds to response from user

PERSONALIZED RECOMMENDATIONS

BACKGROUND

Many systems assist users as they navigate through online information. The systems can provide recommendations to the users. These systems typically show users' information, recommendations and actions in a generic interface and present recommendations to all users based upon fixed suggestions having more to do with the business's product offerings and less to do with the personal needs of the users.

SUMMARY

Embodiments of the disclosure are directed to determining a recommendation based on a signal detected from an executed decision. In some examples, the recommendation is presented through non-traditional communication channels.

According to aspects of the present disclosure, an example computer system for determining a recommendation can include: one or more processors; and non-transitory computer-readable storage media encoding instructions which, when executed by the one or more processors, causes the computer system to: receive a signal associated with an action or an inaction by a user; generate a machine learning model using the signal; process the machine learning model through a rules engine to generate the recommendation; and present the recommendation to the user through a non-traditional communication channel.

According to other aspects of the present disclosure, a computer-implemented method for determining a recommendation can include: receiving a signal associated with an action or an inaction by a user; generating a machine learning model using the signal; processing the machine learning model through a rules engine to generate the recommendation; and presenting the recommendation to the user through a non-traditional communication channel.

The details of one or more techniques are set forth in the accompanying drawings and the description below. Other features, objects, and advantages of these techniques will be apparent from the description, drawings, and claims.

DETAILED DESCRIPTION

Figure 1:
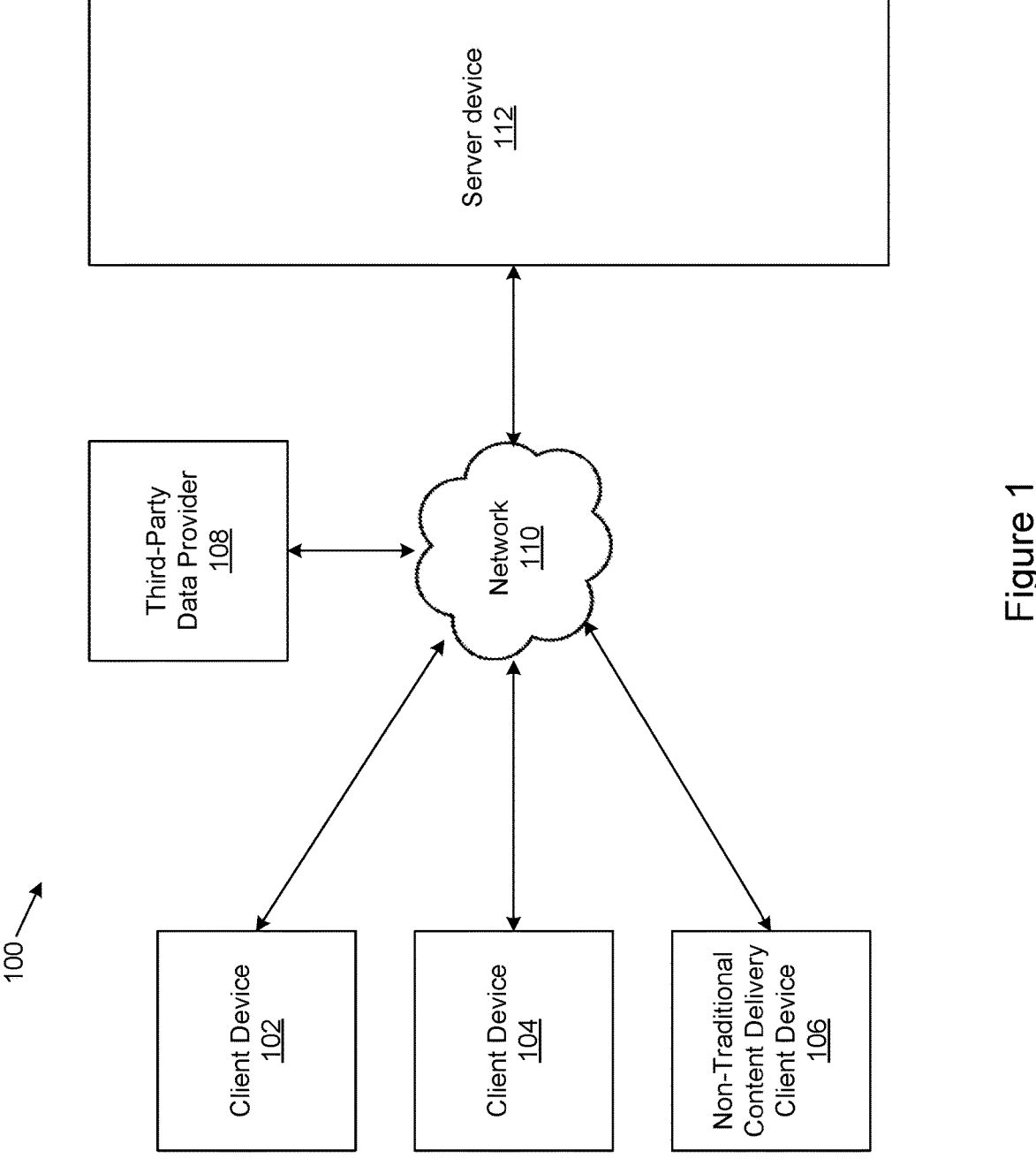
FIG. 1 shows an example system for generating personalized recommendations.

This disclosure relates to generating personalized recommendations that can be presented to users. In some examples, the personalized recommendations are presented through non-traditional communication channels.

In one embodiment, an example system includes a rules engine for user behavior analysis and interaction-based decisions. The example system can enable a customized digital user experience based on a user's attributes, behaviors, and interactions.

The recommendations generated by the system can be applied to various industries. In one example provided herein, the personalized recommendations can be provided for home lending products associated with the financial services industry. A customized digital home lending user experience can thereby be based on the user's data (e.g., balance, monthly payments, escrow, etc. associated with a home loan), and/or information from other third-party data sources that contain data such as home values, home conditions, neighborhood statistics, etc.).

For instance, in some embodiments, the users are customers of the financial institution. In those scenarios, the system can access information about the customers to provide personalized recommendations. In other embodiments, the users are not customers of the financial institution and/or are prospective customers of the financial institution. In those scenarios, the system can still gather information associated with the users or prospective customers to provide recommendations that are personalized based on that information. In yet other examples, the users can be employees of the financial institution and/or parties associated with the financial institution, such as vendors of the financial institution. In those scenarios, the system gathers information associated with the employees or parties to provide personalized recommendations. Additional details are provided below.

In some examples, a machine learning model is generated to provide the recommendations to the users. This model is processed through the rules engine to determine the personalized recommendations for the users. The recommendations can be rendered to the users through a wide variety of non-traditional communication channels, including Internet desktops, smart phones, smart assistants, smart appliances, smart vehicles, drones, audiovisual (AV) outputs, and other self-adaptive Internet of Things (IoT) devices.

One possible implementation includes the system interacting with users in an online account portal for the financial institution. For instance, one of the users logs into the online account portal provided by the financial institution to access information associated with the user's financial accounts. This interaction between the user and the online account portal is used to generate the model. It is appreciated that each generated model can be unique to the corresponding user.

That is, the model for a first user may be different from the model of a second user. Moreover, data may change (e.g., be updated) between different online account sessions for a given user (e.g., the user's checking account balance may increase or decrease between different logins). Accordingly, in some examples, the model generated for the given user may be dynamic, and the model in a first instance may not be identical to the model for that same user in a second instance (e.g., the second instance later in time). Models may be generated based on data gathered internally or externally (e.g., calls to a web service for real-time data). Models may be generated from data, including user attributes, user account information, and user event data.

Models can be passed through the rules engine, which is comprised of an array of rules, to identify the personalized recommendation. As further discussed below, the array of rules applicable to the user may be customizable. In particular examples, the rules engine generates recommendations based upon past and current interactions with the user.

In some examples, the personalized recommendations can be pushed to one or more non-traditional content delivery devices for delivery to the user. The non-traditional content delivery devices can generally include any mechanism that has not historically been used to deliver certain content to the user. This can include devices such as smart assistants like Amazon Alexa or Google Assistant, in non-limiting examples. Many other types of devices can also be used, as described herein.

In certain examples, the non-traditional content delivery devices may be based on the particular recommendation being delivered. In other examples, it may be based on the particular industry relevant to the recommendation. For instance, in a home lending industry, where paper mail or telephone calls are traditional communication channels, non-traditional communication channels may include smart assistants, chatbots and/or dynamic computer user interfaces.

The non-traditional content delivery devices can allow for personalized recommendations to be presented to the user in manners that may be more impactful and helpful to the user. These non-traditional content delivery devices can, for instance, present recommendations in manners not typically consumed by the user, such as through audio, augmented reality, or the like.

For instance, interactions by the user with the online account portal can be gathered in real-time and translated to update the machine learning model and further customize the user's experience. For instance, this information may be used to decide when and where content is presented to the user (e.g., when and where in a given computer user interface graphical information may be presented to the user). The described functionality may also be used to inform an artificial intelligence (AI) chatbot for ongoing engagement with the user and further customize the model in a way that leverages the chatbot or chat conversation to further refine recommendations presented to that user. Additional details are provided below on forming the personalized recommendations and presenting those recommendations to the user, such as through non-traditional content delivery devices.

FIG. 1 schematically shows aspects of an example system 100 of the present disclosure. The system 100 includes client devices 102, 104, a non-traditional content delivery device 106, and a server device 112.

The client devices 102, 104 may be one or more computing devices that can include a mobile computer, desktop computer, or other computing device used by the user to generate or receive data.

In one non-limiting example, the client device 102 is used by the user to access the online account portal. For instance, in one such example, the user may use the client device 102 to access his or her mortgage account at the financial institution. In the examples provided below, the mortgage account can include various information about a mortgage or the user, such as an application for lending, information about the user, and details about the mortgage (e.g., balance, monthly payments, property details, etc.). The server device 112 may provide such information among other data. For example, the server device 112 can provide escrow information about the mortgage.

The non-traditional content delivery device 106 is similar to the client devices 102, 104 except that the non-traditional content delivery device 106 can present communications and interactions to the user in an unconventional manner. As noted above, examples of the non-traditional content delivery device 106 include, without limitation, smart assistants, smart appliances, smart vehicles, drones, audiovisual (AV) outputs, and other self-adaptive Internet of Things (IoT) devices.

While shown as being separate from the client devices 102, 104, in certain examples, the non-traditional content delivery device 106 may be a component of the client devices 102, 104, or may be a sub-component device coupled (e.g., wirelessly coupled) to the client devices 102, 104. For instance, the non-traditional content delivery device 106 may be a software instance executing on the client devices 102, 104 (e.g., a chatbot executing in a web browser, an executing software application, or an executing mobile application). In another example, the non-traditional content delivery device 106 may be a separate computing device wirelessly paired (e.g., via a shortrange wireless technology standard, such as Bluetooth) with the client devices 102, 104, such as a wireless headset or smart watch.

In non-limiting examples, the client devices 102, 104 are used to present personalized recommendations to the user. For instance, when the system 100 detects that the user is in close proximity (such as the user entering his or her home integrated with smart devices), the system 100 can issue a push notification to the non-traditional content delivery device 106, such as voice assistant, where the voice assistant provides the personalized recommendation to the user. One example of such the personalized recommendation is to automate payment of a bill based on the detection of the user's payment patterns.

As discussed herein, non-traditional content delivery device 106 outputs the personalized recommendations to the user on one or more of the client devices 102, 104. Examples of the non-traditional content delivery device 106 can include smart devices configured to deliver the recommendations through the non-traditional communication channels, such as voice assistants, push notifications, chatbots, audio calls, links that lead to a phone call to the user, text messages, audiovisual outputs, or even through devices that are not traditionally used to delivery such recommendations, such as smart appliances, and IoT devices.

The system 100 employs the non-traditional content delivery device 106 to reach the user in everyday environments. In various examples, the system 100 can determine if a particular non-traditional communication channel will be more conducive to the user's preferred interactions. For example, the system 100 may determine that push notifications to voice assistants may be more appealing to the given user than a text message or email that requires that user to stop what they are doing and read the message to digest the message's content.

As illustrated in FIG. 1, the client devices 102, 104, and the non-traditional content delivery device 106 can communicate with the server device 112 through the network 110 to transfer data. The server device 112 can also obtain data via other input devices, which can correspond to any electronic data acquisition processes (e.g., from third parties through an application programming interface-API).

For example, third-party data can be obtained from any data provider, such as a third-party data provider 108 that is in communication with the server device 112 of the system 100. Examples of the third-party data providers 108 include Amazon, IBM, Oracle, SAP, etc. Often, the third-party data is collected from various websites and platforms, including from the third-party data provider 108.

For example, the user may use one of the client devices 102, 104 to visit a health and wellness website and select his or her favorite regimens. The user may then navigate to a reading enthusiast blog, and, finally, the user may fill out a credit card application on a financial institution site. These activities by the user can be captured as third-party data in conjunction with the third-party data provider 108. The system 100 can use the third-party data from the third-party data provider 108, such as the user's browsing history, to provide better personalized recommendations.

The system 100 may obtain other relevant data from the third-party data provider 108, such as behavior, habits, and preferences, including payment patterns, of different consumer profiles from various purchasing channels. The data collected provides the system 100 with information about the user's habits, discomforts, and desires.

For instance, in another example, the user may search the internet for available homes for sale in the user's geographic area. In such an example, the third-party data (e.g., web browser data) captured by the third-party data provider 108 will indicate that the user may be interested in purchasing a home in the near future.

As previously noted, the server device 112 of the system 100 can be managed by, or otherwise associated with, an enterprise (e.g., a financial institution such as a bank, brokerage firm, mortgage company, or any other money-handling enterprise). The server device 112 receives data from one or more of the client devices 102, 104 and the third-party data provider 108.

In one embodiment, the server device 112 is one or more computers (typically a server farm or part of a cloud computing environment) that facilitate the financial services provided by the financial institution. In some examples herein, the server device 112 manages information associated with home lending, such as a mortgage lending process.

In such a scenario, the server device 112 of the system is programmed to provide personalized recommendations associated with home lending. For example, the user may be a customer of the financial institution and use the client device 102 to access mortgage information from the online account portal. In this scenario, the server device 112 may provide access to mortgage information, such as allowing the user to review the escrow balance associated with their mortgage.

For purposes of illustration, the system 100 can analyze the user's actions when reviewing their mortgage information and provide personalized recommendations based upon that activity. For instance, in a non-limiting example, the server device 112 may push a notification to the client device 102 recommending that the user review their escrow balance. The notification to the user can be transmitted via the non-traditional content delivery device 106, which in this example may be the IoT device. The notification can include the escrow balance information, or the system 100 can allow the user to engage with the server device 112 to review their escrow balance.

Figure 2:
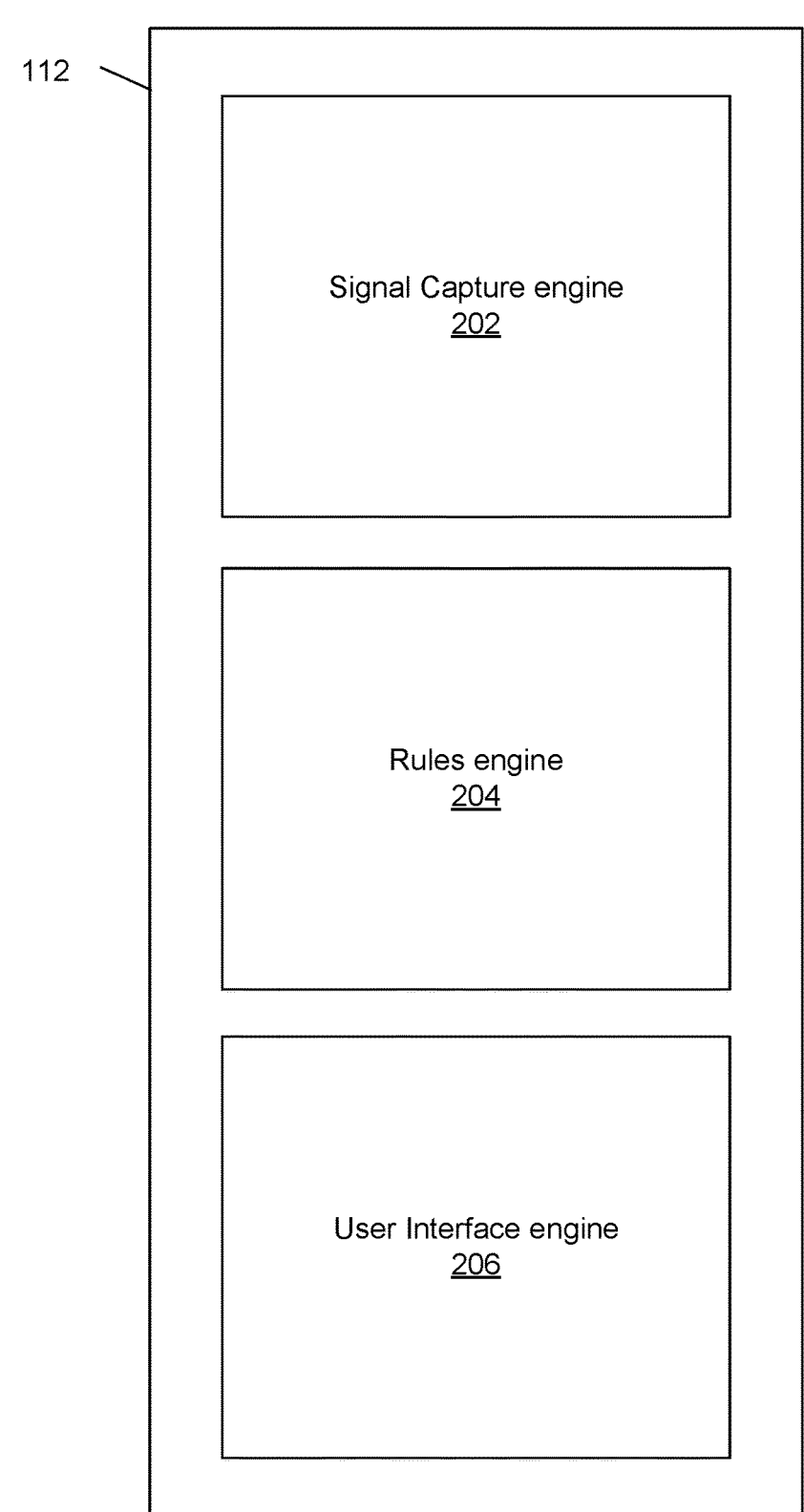
FIG. 2 shows example logical components of a server device of the system of FIG. 1.

FIG. 2 schematically shows aspects of the server device 112 of the system 100. The server device 112 includes a signal capture engine 202, the rules engine 204, and an interface engine 206.

The signal capture engine 202 is configured to capture signals about the user, those signals indicating some notion about the user. Examples of such signals may include actions or inactions that indicate the user's wants or needs.

For instance, user web browser query search terms (i.e., data points), can be detected to infer that the user wants to pay off a loan quickly. This want to pay off a loan quickly can be used as a "signal" by system 100, along with other signals, to construct the model of the user to preselect and customize content for the user, in this instance a customer of the financial institution. That content is unique in its construction and format, permitting it to be communicated via numerous non-traditional communication devices.

In various examples, signals can be captured in numerous ways, including through interactions by the user with IoT devices, online accounts, third-party vendors, etc., and in some examples, through explicit or implicit actions. Signals can be captured wherever data associated with the user's action or inaction can be gathered.

For instance, actions or inactions by the user can be captured by the system 100 and/or the third-party data provider 108 over time. The server device 112 uses machine learning to process information about these actions or inactions by the user. This learning process, when refined, allows the model to provide more meaningful personalized recommendations.

As discussed above, each model generated by the server device 112 can be unique to the corresponding user and the corresponding moment in time (i.e., the moment at which the model is generated). Models may be generated based on the data gathered internally (e.g., on an online financial account page accessed through a financial institution) or externally (e.g., via API calls to the web service for real-time data).

The signals captured by the signal capture engine 202 can also be grouped according to various aspects. For instance, the signals can be grouped according to shared attributes between users, such as a family, coworkers, or neighborhood.

The signals captured by the signal capture engine 202 are processed through the rules engine 204 to generate the personalized recommendations. In generally, the rules engine 204 is comprised of a complex web of interrelated rules that are programmed to identify personalized recommendations based upon the captured signals.

In some examples, the rules engine 204 may be customized through a web-based tool that allows administrators for the server device 112 to customize how the rules are configured and applied. In examples described further below, the rules engine 204 allows for customize rules to be generated for the rules engine 204. In certain examples, various aspects associated with each of the rules can be altered, such as the data associated with the rule, thresholds associated with qualifying for application of the rule, and/or a rule priority defining how the personalized recommendation generated by the rule can be presented to the user in a particular hierarchy.

More specifically, in various examples, the rules engine 204 includes logic to determine which recommendations to display to the user, how to display those recommendations to the user, and where to present the recommendations to the user (e.g., a specific location within the user interface). In many instances, the recommendations may comprise more than basic financial information. For example, the content may include a recommendation for user action. Further, the rules engine 204 may provide further or altered personalized recommendations based on signals captured during or after delivery of the recommendation to the user.

One example to illustrate capture of the signal by the signal capture engine 202 and application of rules by the rules engine 204 is when the user is in financial distress. In such a situation, the signal capture engine 202 can receive one or more signals indicating that the user is experiencing financial difficulty (e.g., struggling to meet outstanding credit obligations). That is, the signal capture engine 202 may capture a corresponding signal inferred from the user's online financial account indicating that a credit card bill is past due, and the user's available savings account balance is insufficient to cover an outstanding credit balance.

Based on at least this signal, the model is generated for the user by the signal capture engine 202, and the model is run through the rules engine 204. The rules engine 204 generates one or more recommendations. The recommendations may include ways to alleviate the financial stress, mechanisms to help the user handle emotional impacts that may be associated with the financial stress, and links, content, and other helpful guides to help outline the next steps for the user's economic recovery.

In another example, a use case for the system 100 described herein with reference to at least FIG. 1 and FIG. 2 includes detecting that the user is financially stable, or overperforming relative to other similarly situation customers (or that user's financial goals). In such a situation, the rules engine 204 may recommend an activity (or activities) to further improve the user's financial condition, such as paying-off the loan faster than initially scheduled, allocating more money to a retirement account, or reducing an outstanding credit balance, to name a few examples.

In another example, another use case may include detecting that available mortgage interest rates are low. For instance, the signal capture engine 202 may capture the signal that mortgage interest rates are low for the user's geographic location (e.g., based on the user's residence zip code, user's current geographic location (via GPS), or IP address). For instance, the signal capture engine 202 may capture this information from internal data source, or a third-party API. Based on at least this signal, the rules engine 204 may recommend that the user take advantage of the low rates to refinance the user's mortgage.

The interface engine 206 is programmed to present the personalized recommendations to the user. This can be in various formats, including visual, audible, etc., depending on the specific non-traditional communication channel selected.

In some implementations, the personalized recommendations are provided by the rules engine 204 to the interface engine 206 to determine how to present the recommendations to the user. For instance, in some examples, the personalized recommendations are merged with other data to be presented to the user.

In such scenarios, the personalized recommendations are presented by the interface engine 206 on content tiles that are merged with the other data for presentation to the user. Examples of such content tiles are described below with reference to FIGS. 3-5. The interface engine 206 uses the content tiles to build the interface for the user.

In some examples, the content tiles are text-based items that can be used to build a customized user interface for the user, that user interface configured to be rendered by the interface engine 206. Tiles may be utilized to display customized content in a customized display (e.g., customized format and location of content within the user interface). Tiles can enable a modular construction of the user interface based on dynamic content specific to the user.

Due to the "decoupled" nature of the content tiles, the content tiles can alternatively be sent through a translation language for presentation by other non-traditional communication channels, such as interactive voice response devices.

The decoupled nature of the content tiles also allows them to more easily be incorporated into existing user interfaces.

For instance, messages that are related to a particular time or geographic area can be easily surfaced by the interface engine 206 as appropriate.

For instance, personalized recommendations associated with the COVID-19 pandemic can be generated by the interface engine 206 during a specific time period and removed after the messages are no longer relevant. In another example, the recommendations may be localized to a particular geographic area. For instance, when a natural disaster occurs in an area, an established rule in the rules engine 204 can be triggered to send recommendations to users upon detection of inclement weather warnings. Further, the system can send push notifications to the user via the non-traditional content delivery devices, such as Amazon Alexa or Google Assistant.

Many other examples are possible. For instance, the system 100 can provide recommendations that are related directly or peripherally to the signals received from the user. For instance, the system 100 can learn that the user owns a home through mortgage payments made by the user using an online lending platform. The system can then process these signals and, through certain rules, generate personalized recommendations to the user. These could, for instance, be directly related to the mortgage, such as payment of the mortgage over time. These could also be indirectly related to the mortgage, such as personalized recommendations about maintenance for the user's home (e.g., a reminder to change the furnace filter and access to replacement items that fit the user's specific furnace).

Figure 3:
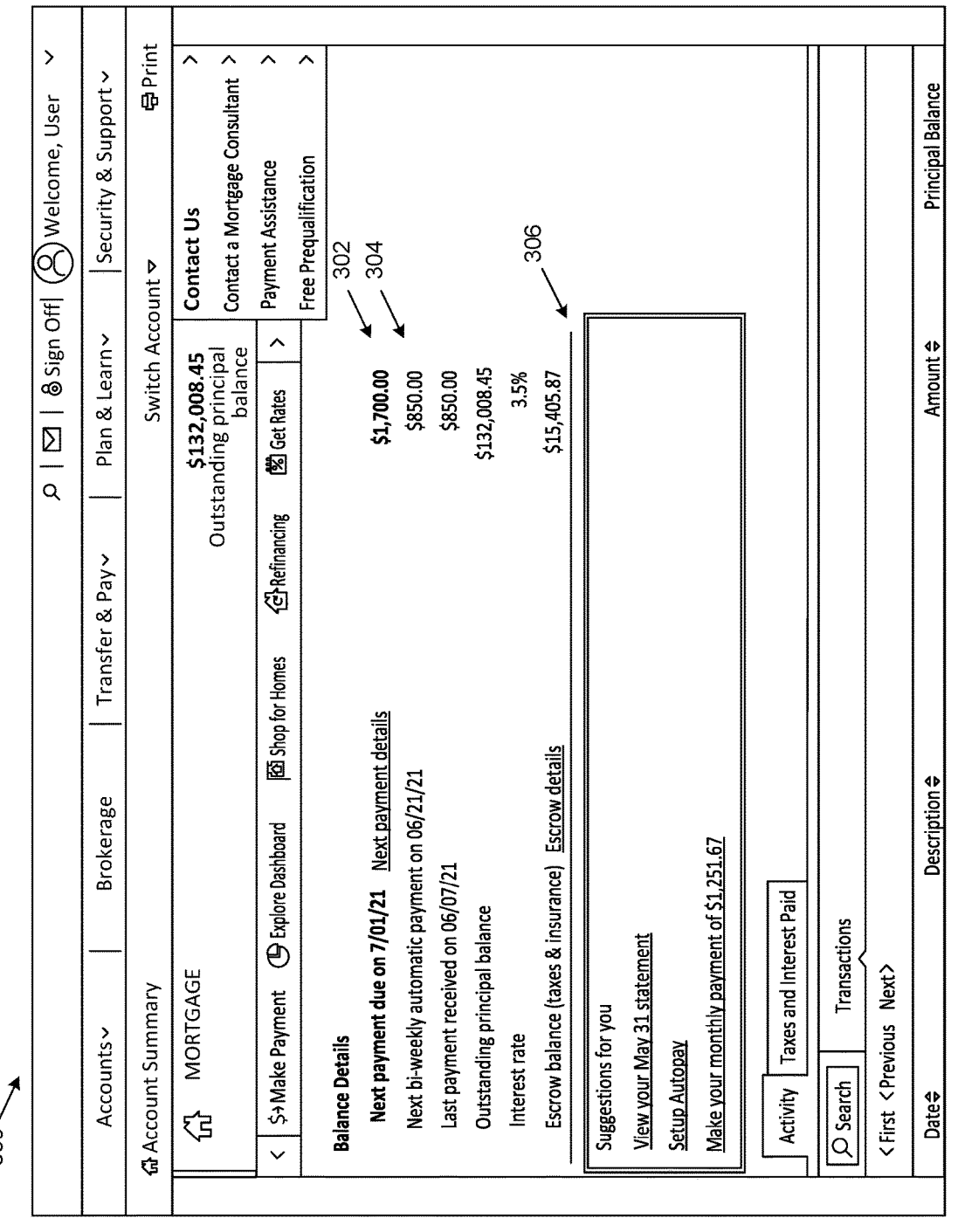
FIG. 3 shows an example user interface with personalized recommendations generated by the server device of FIG. 2.

Referring now to FIG. 3, an example interface 300 generated by the interface engine 206 of the server device 112 is shown. This interface 300 is generally customized for the user, that may be presented to the user after the user has logged-in to their online banking account to review their online banking information. It is noted that although a graphical interface is shown, the interface engine 206 can interface with the user through many other non-traditional communication channels, such as through audio or other non-traditional content delivery devices.

The user interface in FIG. 3 displays mortgage details for the user. The user is presented with an account summary page that displays the balance details and other information associated with the mortgage. As illustrated, a balance details section may include an array of listed information, such as next payment due information (highlighted in section 302). Next payment due information is illustrated in FIG. 3 as including a due date for the user's next mortgage payment. Proximate section 302, the example interface includes an indication of the next bi-weekly automatic payment for the user (e.g., indicated by section 304, and shown below section 302 in FIG. 3). Accordingly, sections 302 and 304 show the user that the user has the mortgage payment due, and a scheduled payment towards reducing their mortgage at the financial institution.

As further illustrated in FIG. 3, the interface 300 additionally includes the section 306, which include personalized recommendations that may be generated by the server device 112. The suggestions displayed are the result of the event-driven signal captured by the signal capture engine 202, generation of the machine learning model that was processed through the rules engine 204 to determine the best-fit recommendations under the given circumstances, and rendering of the suggestions to be presented to the user by the interface engine 206.

More specifically, the section 306 provides the following personalized recommendations. The first recommendation is "View your May 31 statement", which is generated by the interface engine 206 upon the signal being received by the server device 112 indicating that the user usually reviews her statement each month. This recommendation can also be defined based upon a particular day (e.g., the user reviews her statement at the end of each month) or even time (the user ends her day reviewing the statement).

A second recommendation of the section 306 is "Setup Autopay", which can be generated based upon various signals received from or otherwise associated with the user. For instance, the user may have just setup an online bill account, which allows for autopayment. In another example, the user may have setup autopayment on a different account unassociated with the mortgage account shown on the interface 300, which shows a propensity for the user to use autopayment.

Finally, the second recommendation of the section 306 is "Make your monthly payment of $1,251.67". This recommendation can be generated based on various signals associated with the user. For instance, the signals received by the server device 112 may indicate that the user likes to pay her mortgage balance on a particular date or time, so that the server device 112 can provide the personalized recommendation at that day or time. Many other configurations for the example recommendations as shown are possible.

In another example, the signal may be captured indicating that the user has a pattern of paying their mortgage payments promptly (e.g., captured by the signal capture engine 202 of the server device 112. The captured signal indicating the user's inclination to pay promptly is used (possibly among other signals or information) to generate the user model, which is processed through the rules engine 204. The rules engine 204 generates recommendations well-suited to the user.

In another example, the user may have a pattern of inconsistently paying-off debt, or routinely incurring late fees for failing to comply with a payment schedule. In such a situation, the signal is captured indicating the user's habit (e.g., captured from payment history data on an online banking platform), and the model is generated and processed by the rules engine 204 to present recommendations to the user, the particular recommendations designed to help the user remedy those habits. In this example, the recommendations can include a link to an article on budgeting with a mortgage, live assistance with a representative to discuss financial planning, and general tips regarding proper money management and the impacts of timeliness in payments. If the user has shown regular habits of paying debt inconsistently, the recommendations can include the link to the article on budgeting with a mortgage. Those recommendations links may be presented within section 306 as displayed through the interface engine 206.

Figure 4:
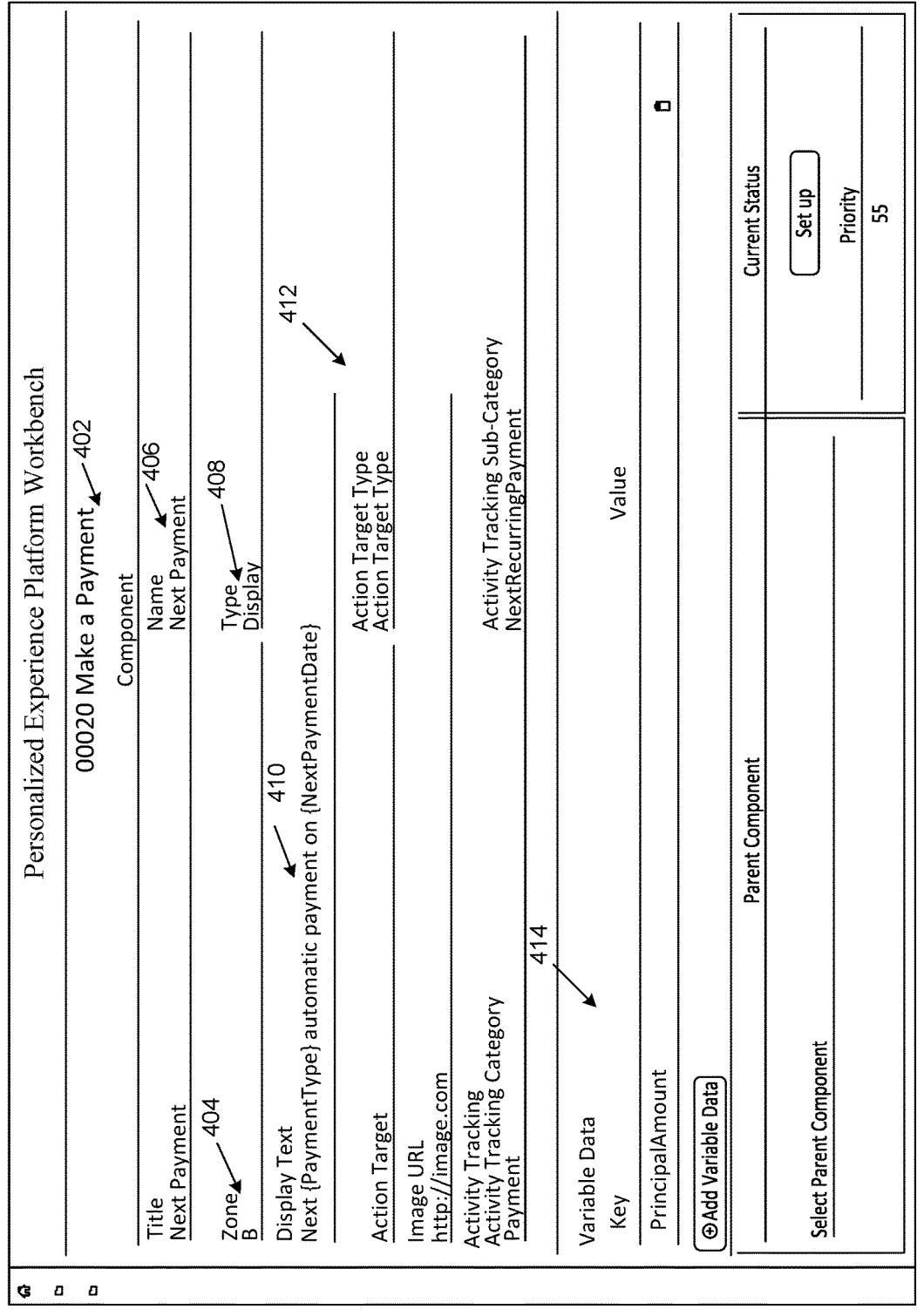
FIG. 4 shows an example user interface displaying a rules engine generated by the server device of FIG. 2.
Figure 5:
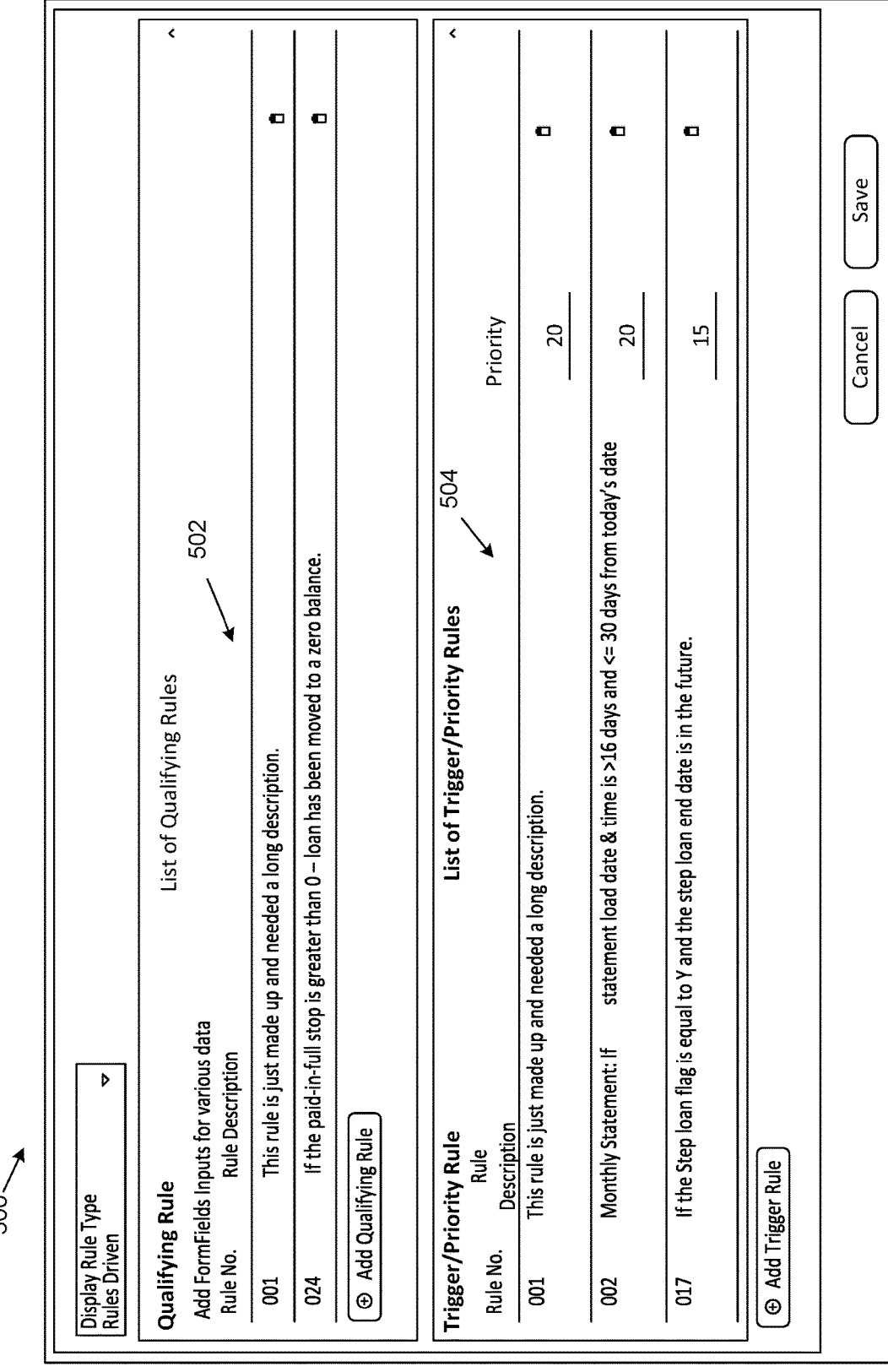
FIG. 5 shows additional example aspects of the user interface of FIG. 4.

FIGS. 4-5 schematically show an interface 400 which is programmed to create, update, and/or delete the rules used by the rules engine 204.

More specifically, the interface 400 allows an administrator of the system 100 to configure various aspects of the recommendations that are provided to the user based upon the rules. For example, aspects of a specific recommendation ("Make a Payment") are shown in the interface 400, including a title, name, type, display text, action target, action target type, images, activity tracking and subcategories, and variable data, including key and value pairs.

More specifically, the interface 400 of FIG. 4 allows the administrator to configure a rule through the various attributes defined on the interface 400. This allows the administrator to adjust the configuration of the rules for the rules engine 204 without requiring changes be made to the underlying code. For instance, interface 400 permits the user to configure content such that different content is rendered in a desired order.

A component section 402 identifies the particular rule that is currently being edited on the interface 400. For instance, this is the name of the rule.

A zone section 404 refers placement of the recommendation generated according to the rule. For example, an interface that is used to present the recommendations to the user (see interface 300) can be setup in a grid fashion. The zone section 404 define where on that grid the recommendation from the rule will appear, should the recommendation be delivered on the client device 102. In other examples, a value in the zone section 404 can be used to define placement of the recommendation for the non-traditional communication channels. For example, the value for the zone section 404 "B" can indicate that the recommendation generated by the rule can be placed in a particular order with respect to other information sent though the non-traditional communication channels and/or otherwise delivered by non-traditional content delivery devices.

In addition, the interface 400 includes a name section 406 and a type section 408 for the rule. The name section 406 can include a descriptive indicator, such as "Next Payment" in the example. The type section 408 is a general type for the rule. In this example, the type is "Display", which indicates that the recommendation from the rule will be presented to the user. Other example types can include Action, which would trigger an action for the user, and Control, which would accept input from the user to control some aspect of the system. Other configurations are possible.

The interface 400 also includes a display text section 410 that provides the text used for the recommendation. The display text can include static text (e.g., "Next"), along with variables that are defined for the rule. For instance, in this example, the variable "{PaymentType}" is defined. The variables can be populated through lookups in one or more data stores when the recommendation is presented for the user, as described further below.

The interface 400 also includes action information section 412 that defines various actions associated with the recommendation generated by the rule. In this example, the actions include an image source location (e.g., a JPG or other image to display), an action target type (e.g., the type of action to be done), and tracking information associated with the action.

Finally, the interface 400 includes the variable data section 414 associated with the rule. In this example, a variable "PrincipalAmount" is defined, and a value is assigned to the variable. Additional variables can be defined, as needed, for the component section 402. As noted, the variables can be used to define data to be retrieved from other sources and/or store state information associated with the component section 402.

FIG. 5 displays another portion 500 of the interface 400. The portion 500 of the interface 400 includes a qualifying rules section 502 that defines prerequisites for the rule to apply and a triggering rule section 504 that defines rules that result in the triggering of the rule and associated personalized recommendation.

More specifically, the qualifying rules section 502 defines rules that must be true before the rule can be triggered. The qualifying rules section 502 assures that rules are applied in appropriate instances to create recommendations. In this instance, an example is qualifying rule 024, which requires a loan balance to be greater than zero for the rule to apply. In such a scenario, the rule creating the recommendation for repayment of the loan should not be triggered if the loan is already paid off (i.e., balance is zero).

The rules indicated by qualifying rules section 502 can be deleted, modified, and reinserted as needed. For example, suppose the qualifying rule from the qualifying rules section 502 is applicable only for a particular duration (e.g., during tax season). In that case, the rule can be automatically activated and/or automatically removed from active use at the end of the particular duration (e.g., after-tax season ends).

A triggering rule section 504 provides the rules that must be satisfied for the recommendation to be generated. In addition, the triggering rule section 504 can define a priority for the rule. This can be important when multiple rules are triggered, which can result in multiple recommendations for which the priority can be defined.

For instance, one of the example triggering rules in the triggering rule section 504 is rule "002", which relates to the date of a statement, such as a mortgage statement for the user. In this example, the rule is triggered if the current date is between 16 and 30 days from the current date. Many other configurations are possible.

Figure 6:
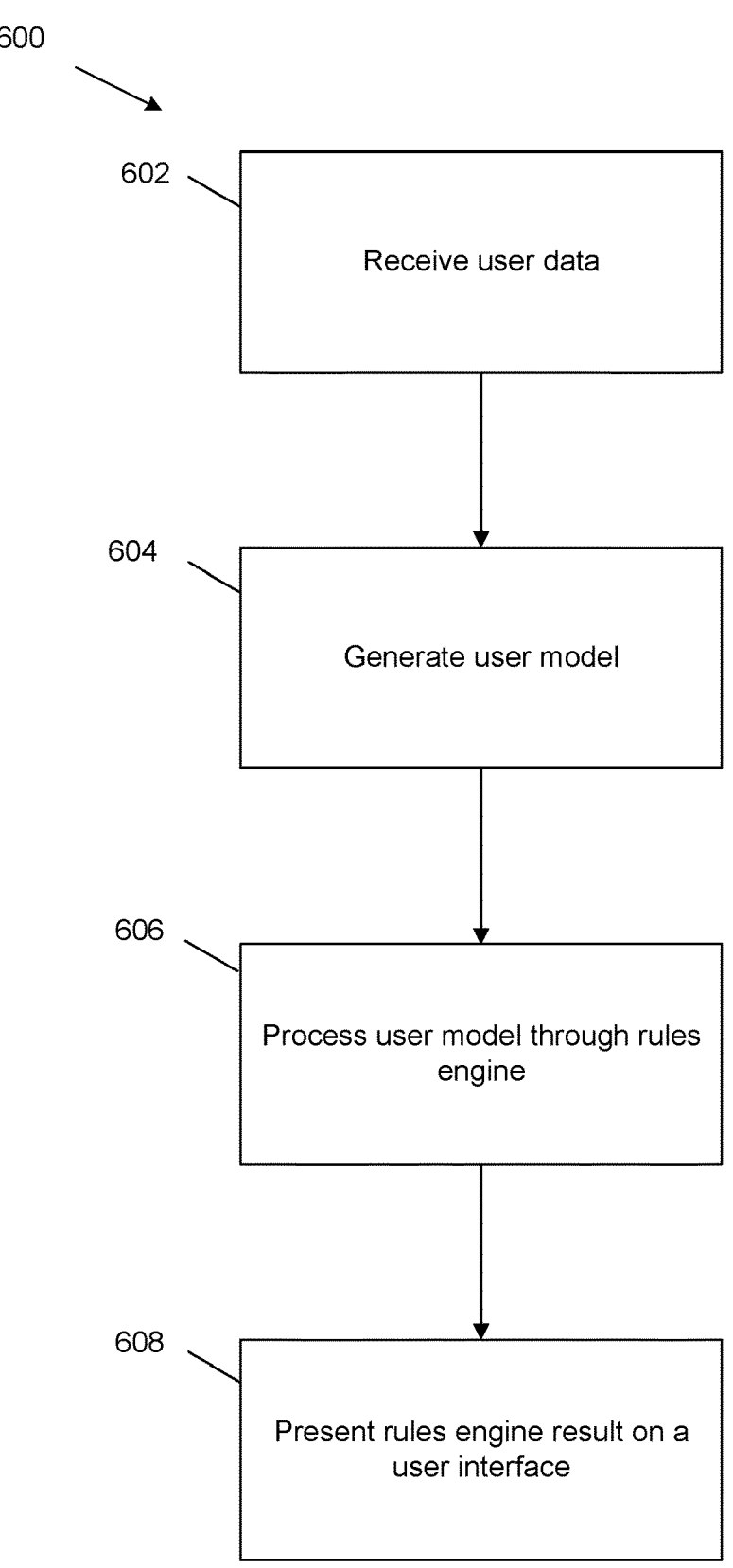
FIG. 6 shows an example method for generating personalized recommendations implemented by the system of FIG. 1.

Referring now to FIG. 6, an example method 600 for generating the personalized recommendation is shown.

At step 602, user data is received by the user. For instance, various signals can be captured as the user interacts with the system, and these signals are used to provide the personalized recommendations described herein.

Next, at operation 604, the model is generated based on the user data received from the user. The model can be a unique model for each user and is built using the received signals. Models may be generated based on data gathered internally or externally (e.g., calls to a web service for real-time data). The models can be self-adaptive and dynamically generated based on the associated signals received.

Next, at operation 606, the generated user model is processed through the rules engine 204. The processing of the model can occur in near real-time, and the rules engine 204 output can be modified based on further incoming data. For example, if the initial signal received is subsequently contradicted, the model can self-adapt and adjust accordingly. The new model can be presented to the rules engine 204 to generate content based on the most recently received model.

Last, at operation 608, the result generated by the rules engine 204 is presented to the user using the interface engine 206. The resulting content can be pushed to the user in numerous non-traditional ways and through non-conventional content delivery devices, such as voice assistants in audio form, audio calls, links that lead to a phone call to the user, text messages, push notifications to a home assistant, etc.

The system can also send the notification to a third-party application and inform the user of the notification to the third-party application. For example, in another scenario, the system 100 can receive a signal indicating that a home repair is needed. In that case, the system 100 can send the notification to the third-party application to initiate the home repair.

Figure 7:
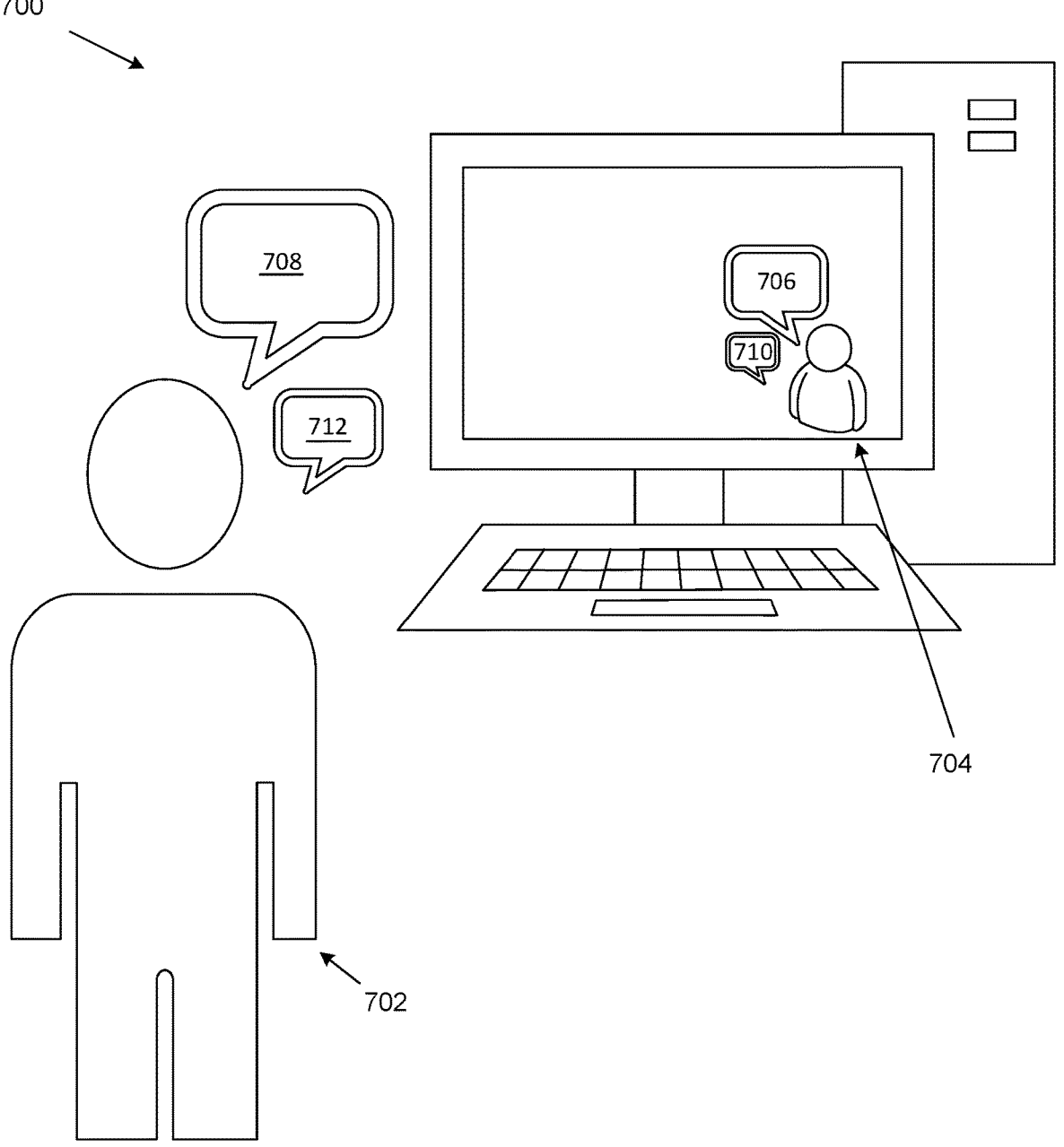
FIG. 7 shows an example interaction between a client and a chatbot of the system of FIG. 1.

Referring now to FIG. 7, an example is shown of a user 702 interacting with the chatbot 704 in the user interface generated by the interface engine 206. The chatbot 704 is one example of the non-traditional communication channels that can be used to deliver the personalized recommendations. The chatbot 704 is designed to sustain ongoing engagement with the user 702. The model behind the chatbot

704 adapts as it chats with the user 702 in real-time and dynamically learns from the user's signals. User engagement can occur in various channels, not limited to chatbots.

An alternative to the chatbot 704 can be an agent chat. The agent chat can be a human that interacts with the user 702 through the user interface generated by the interface engine 206. The human can be a representative from the respective business with which the user 702 has a relationship, such as a financial institution's customer service representative.

Here, the chatbot 704 initiates a discussion in dialogue 706, to which the user 702 responds in dialogue 708. The chatbot 704 can be programmed to transition from the human to artificial intelligence (and vice versa) as needed. For example, if the dialogue indicates a context that the chatbot 704 is not equipped to handle, the chatbot 704 may request the human agent to assist with the issue. Once the human agent addresses the issue, the chatbot 704 may proceed with the discussion with the user 702.

The chatbot 704 presents further dialogue 710 based on what the chatbot 704 learned from the user's 702 dialogue in 708. For example, the chatbot 704 will continuously read for signals captured by the signal capture engine, continuously update the model based on the captured signals, and run the newly generated model through the rules engine 204 to interact with the user 702 in a timely and responsive manner, as if the user 702 is communicated with the human agent that reacts to user 702 as needed.

The user 702 responds to the chatbot 704 in dialogue 712. The dialogue between the user 702 and the chatbot 704 can continue until the user 702 deems the interaction complete. Other configurations for the determination of completion are possible.

In the chatbot's 704 non-traditional way of pushing data to the user 702, the user 702 can respond to the chatbot 704 and receive a dynamically alternated recommendation in response to the user's 702 real-time thought processing, as if engaged with a reactive human. The chatbot 704 is a condensed, real-time interactive content delivery system that renders the appropriate action or content.

Figure 8:
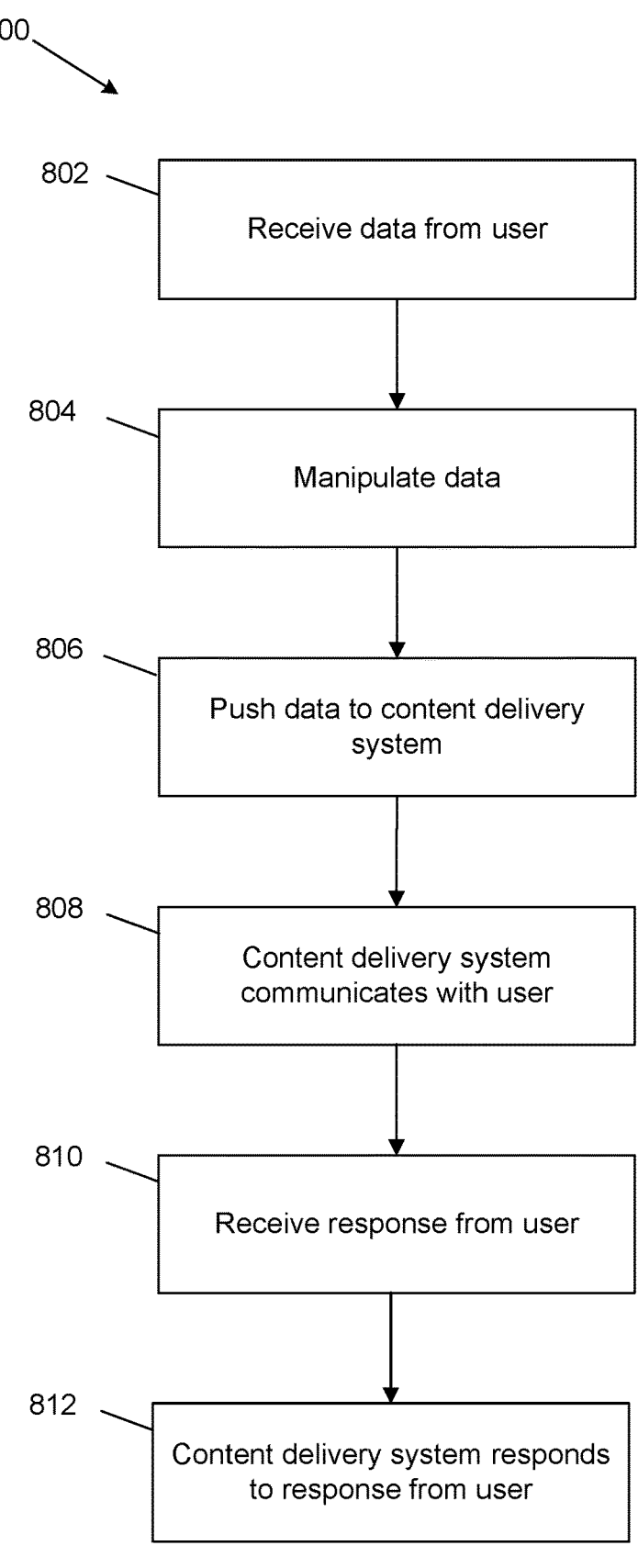
FIG. 8 shows another example method implemented by the system of FIG. 1.

Referring now to FIG. 8, an example method 800 for interacting with a user using the non-traditional communication channel is shown.

At step 802, signals are received from the user. This can be accomplished in various ways as described herein.

Next, at operation 804, the data is manipulated through the rules engine 204. The received data is processed in the machine learning model reviewed by the rules engine 204 to see if any predetermined rules are triggered.

Next, at operation 806, the personalized recommendation is pushed to the non-traditional content delivery device, such as the chatbot. Other examples of non-traditional content delivery devices can include a voice assistant, push notification, audio call, links that lead to a phone call to the user, text message, drones, audiovisual outputs, smart vehicles, smart appliances, and Internet of Things devices.

At step 808, the personalized recommendation is presented to the user. This can be accomplished in various ways, including through a dialogue with the chatbot. Based on the multiple ways of communicating with the user, the communications can be interactive as the user desires. For example, the recommendation can be presented in an audio format.

At operation 810, the system receives a response from the user. The system can alter its recommendations based on the response received from the user. For example, if the user interjects an unexpected topic mid-conversation, the system can adjust its recommendations accordingly.

Finally, at operation 812, the system responds to the response from the user, with consideration for the real-time discussion points stated by the user.

Figure 9:
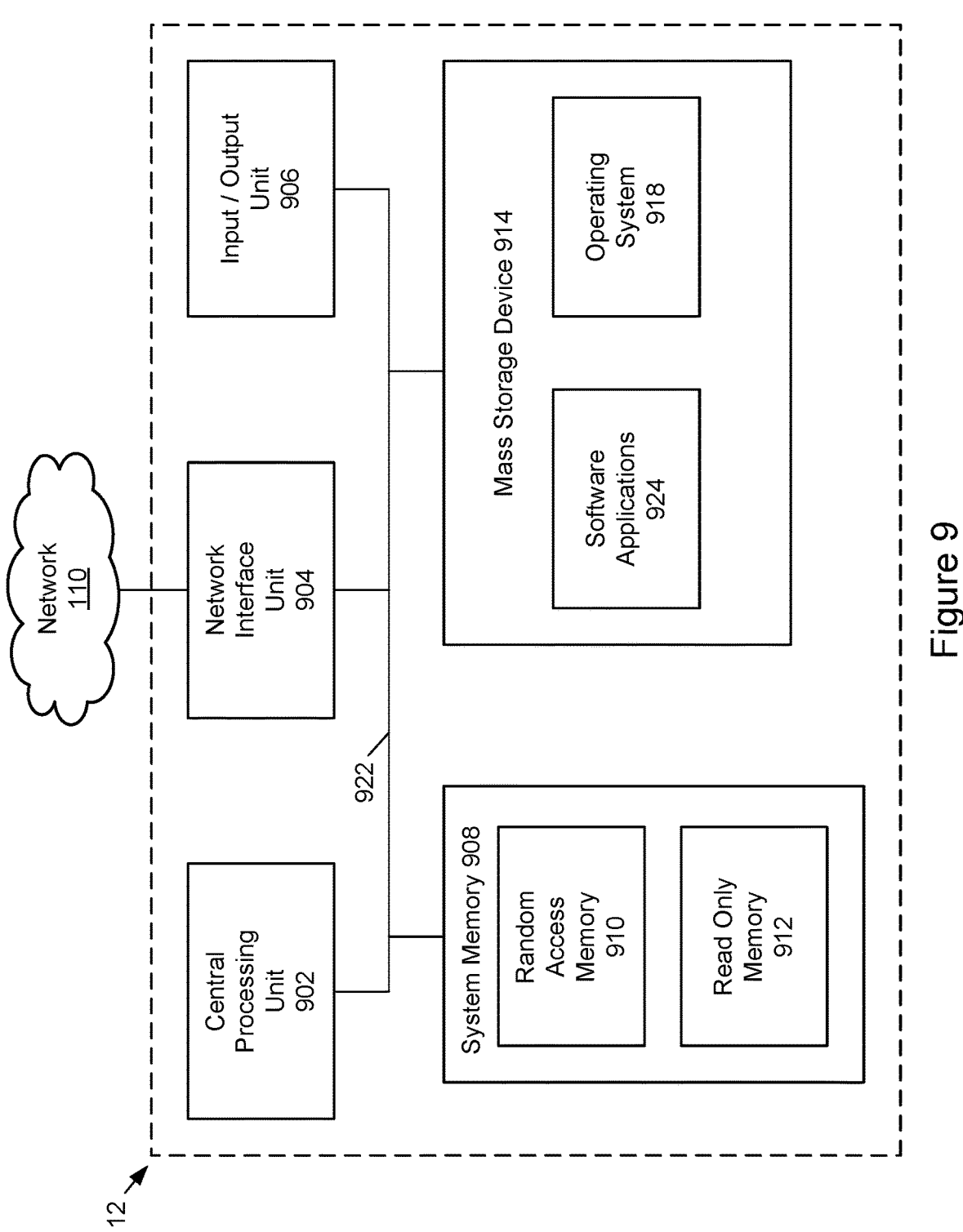
FIG. 9 shows example components of the server device of FIG. 2.

As illustrated in the example of FIG. 9, the example server device 112 includes at least one central processing unit ("CPU") 902, a system memory 908, and a system bus 922 that couples the system memory 908 to the CPU 902. The system memory 908 includes a random access memory ("RAM") 910 and a read-only memory ("ROM") 912. A basic input/output system containing the basic routines that help transfer information between elements within the server device 112, such as during startup, is stored in the ROM 912. The server device 112 further includes a mass storage device 914. The mass storage device 914 can store software instructions and data. A central processing unit, system memory, and mass storage device similar to that in FIG. 9 are also included in other computing devices disclosed herein (e.g., devices 102, 104, 106).

The mass storage device 914 is connected to the CPU 902 through a mass storage controller (not shown) connected to the system bus 922. The mass storage device 914 and its associated computer-readable data storage media provide non-volatile, non-transitory storage for the server device 112. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 112.

According to various embodiments of the invention, the server device 112 may operate in a networked environment using logical connections to remote network devices through network 110, such as a wireless network, the Internet, or another type of network. The server device 112 may connect to network 110 through a network interface unit 904 connected to the system bus 922. It should be appreciated that the network interface unit 904 may also be utilized to connect to other types of networks and remote computing systems. The server device 112 also includes an input/output controller 906 for receiving and processing input from a number of other devices, including a touch user interface display screen or another type of input device. Similarly, the input/output controller 906 may provide output to a touch user interface display screen or other output devices.

As mentioned briefly above, the mass storage device 914 and the RAM 910 of the server device 112 can store software instructions and data. The software instructions include an operating system 918 suitable for controlling the operation of the server device 112. The mass storage device 914 and/or the RAM 910 also store software instructions and applications 924, that when executed by the CPU 902, cause the server device 112 to provide the functionality of the server device 112 discussed in this document. For example, the mass storage device 914 and/or the RAM 910 can store the signal capture engine 202, the rules engine 204, and the interface engine 206.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for determining a recommendation, comprising:

one or more processors; and non-transitory computer-readable storage media encoding instructions which, when executed by the one or more processors, cause the computer system to:

receive, from one of a plurality of electronic sources, a signal associated with an action or an inaction by a user;

generate a machine learning model using the signal, including to:

cluster the signal from the one of the plurality of electronic sources with further signals to determine patterns of user behaviors, wherein the further signals include interactions with smart devices in proximity-enabled environments to determine which of a plurality of non-traditional communication channels will be more conducive to preferred interactions;

train the machine learning model using the signal and the further signals as clustered to identify user preferences; and dynamically update the machine learning model based on the patterns of user behaviors and the user preferences relating to an account portal, wherein the machine learning model continuously processes information about the patterns of user behaviors and the user preferences captured over multiple sessions, from the signal and the further signals, associated with the account portal to refine the machine learning model and provide more personalized recommendations, wherein the machine learning model is unique to the user and dynamically updates based on changes to account information for the user captured on the account portal over the multiple sessions;

process the machine learning model through a rules engine to generate the recommendation, wherein the rules engine comprises interrelated rules programmed to identify the personalized recommendations based upon the signal and the further signals, wherein the interrelated rules include qualifying rules having thresholds associated with application of each rule and priorities defining a hierarchy for presenting the personalized recommendations to the user, and wherein the qualifying rules are satisfied before triggering generation of the recommendation;

detect, using at least one device, that the user has entered a proximity-enabled environment of the proximity-enabled environments integrated with the smart devices;

select, using the machine learning model, a non-traditional communication channel from the plurality of non-traditional communication channels based upon a proximity of the user provided by the at least one device in the proximity-enabled environment, wherein the non-traditional communication channel is more conducive to the preferred interactions; and present the recommendation to the user through the non-traditional communication channel on one of the smart devices, wherein the recommendation is presented in audio form through a voice assistant of the one of the smart devices based on detection of the user entering the proximity-enabled environment.

2. The computer system of claim 1, wherein the non-traditional communication channel includes one or more of: smart assistant, push notification, chatbot, audio call, smart vehicles, smart appliances, and an Internet of Things device.

3. The computer system of claim 1, wherein the recommendation is presented by a chatbot or an agent chat, and wherein the further signals from the user in response to the recommendation are sent to the rules engine.

4. The computer system of claim 1, wherein the signal is received from a third-party source.

5. The computer system of claim 1, wherein the rules engine makes a decision based upon a trigger captured by the signal.

6. The computer system of claim 1, comprising further instructions which, when executed by the one or more processors, cause the computer system to generate the machine learning model using artificial intelligence.

7. The computer system of claim 1, comprising further instructions which, when executed by the one or more processors, cause the computer system to send a notification to a third-party application.

8. The computer system of claim 1, wherein the signal is associated with home lending.

9. The computer system of claim 8, comprising further instructions which, when executed by the one or more processors, cause the computer system to generate a personal recommendation associated with an account for the home lending.

10. The computer system of claim 8, comprising further instructions which, when executed by the one or more processors, cause the computer system to capture a pattern of the user associated with an account for the home lending.

11. A computer-implemented method for determining a recommendation, the method comprising:

receiving, from one of a plurality of electronic sources, a signal associated with an action or an inaction by a user;

generating a machine learning model using the signal, including:

clustering the signal from the one of the plurality of electronic sources with further signals to determine patterns of user behaviors, wherein the further signals include interactions with smart devices in proximity-enabled environments to determine which of a plurality of non-traditional communication channels will be more conducive to preferred interactions;

training the machine learning model using the signal and the further signals as clustered to identify user preferences; and dynamically updating the machine learning model based on the patterns of user behaviors and the user preferences relating to an account portal, wherein the machine learning model continuously processes information about the patterns of user behaviors and the user preferences captured over multiple sessions, from the signal and the further signals, associated with the account portal to refine the machine learning model and provide more personalized recommendations, wherein the machine learning model is unique to the user and dynamically updates based on changes to account information for the user captured on the account portal over the multiple sessions;

processing the machine learning model through a rules engine to generate the recommendation, wherein the rules engine comprises interrelated rules programmed to identify the personalized recommendations based upon the signal and the further signals, wherein the interrelated rules include qualifying rules having thresholds associated with application of each rule and priorities defining a hierarchy for presenting the personalized recommendations to the user, and wherein the qualifying rules are satisfied before triggering generation of the recommendation;

detecting, using at least one device, that the user has entered a proximity-enabled environment of the proximity-enabled environments integrated with the smart devices;

selecting, using the machine learning model, a non-traditional communication channel from the plurality of non-traditional communication channels based upon a proximity of the user provided by the at least one device in the proximity-enabled environment, wherein the non-traditional communication channel is more conducive to the preferred interactions; and presenting the recommendation to the user through the non-traditional communication channel on one of the smart devices, wherein the recommendation is presented in audio form through a voice assistant of the one of the smart devices based on detection of the user entering the proximity-enabled environment.

12. The method of claim 11, wherein the non-traditional communication channel includes one or more of: smart assistant, push notification, chatbot, audio call, smart vehicles, smart appliances, and an Internet of Things device.

13. The method of claim 11, wherein the recommendation is presented by a chatbot or an agent chat, and wherein the further signals from the user in response to the recommendation are sent to the rules engine.

14. The method of claim 11, wherein the signal is received from a third-party source.

15. The method of claim 11, wherein the rules engine makes a decision based upon a trigger captured by the signal.

16. The method of claim 11, further comprising generating the machine learning model using artificial intelligence.

17. The method of claim 11, further comprising sending a notification to a third-party application.

18. The method of claim 11, wherein the signal is associated with home lending.

19. The method of claim 18, further comprising generating a personal recommendation associated with an account for the home lending.

20. The method of claim 18, further comprising capturing a pattern of the user associated with an account for the home lending.

* * * * *